G. REED, W. C. HOAGLAND & J. J. NEWSOM.

R Hochkofler, Guardian of G. Reed, insane. Rosa Holland, Assignee

WINDOW-SCREEN.

No. 7,664.

Reissued May 8, 1877.

Witnesses

Geo. H. Strong

Jns. L. Boone

Inventor

George Reed

R. Hochkofler his Guardian

W. C. Hoagland

J. J. Newsom by Dewey & Co.

Attys

UNITED STATES PATENT OFFICE

RUDOLPH HOCHKOFLER, (GUARDIAN OF GEORGE REED, INSANE,) WILLIAM C. HOAGLAND, AND JOHN J. NEWSOM, OF BROOKLYN, CALIFORNIA; SAID HOAGLAND AND NEWSOM ASSIGNORS TO ROSA HOLLAND.

IMPROVEMENT IN WINDOW-SCREENS.

Specification forming part of Letters Patent No. 102,154, dated April 19, 1870; reissue No. 7,664, dated May 8, 1877; application filed February 13, 1877.

*To all whom it may concern:*

Be it known that we, GEORGE REED, WILLIAM C. HOAGLAND, and JOHN J. NEWSOM, all of Brooklyn, county of Alameda, and State of California, have invented an Improved Screen Attachment for Windows; and we do hereby declare the following to be a full, clear, and exact description thereof.

The nature of our invention is to provide an improved screen attachment for the upper and another for the lower sashes of windows, so that when the sashes are opened the screens will automatically and simultaneously be drawn across the opening, and thus prevent the entrance of insects.

Our improved window-screens are arranged to slide, like drawers, into vertical boxes or recesses in the casing or wall, one of which is arranged above and one below the window-opening, so that the screens can be attached to and operated by the window-sashes.

Figure 1:
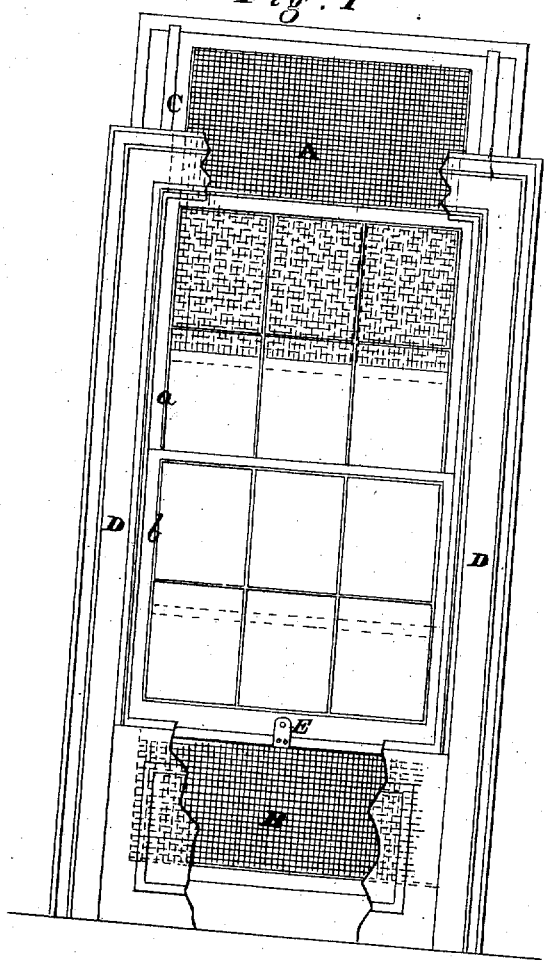
Figure 2:
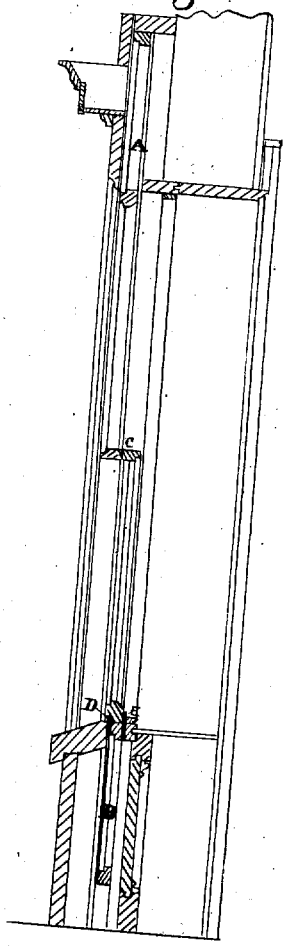
Figure 3:
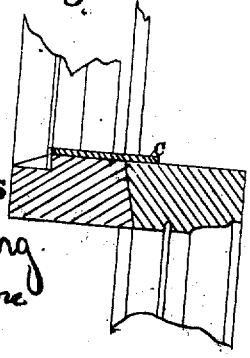
Figure 4:
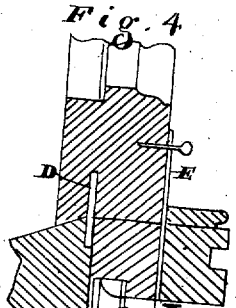

Referring to the accompanying drawing, Figure 1 is a front elevation of a window with screens attached; Fig. 2, a transverse section of the same; Fig. 3, a cross-section of the junction of the upper and lower sashes; Fig. 4, a cross-section of the bottom of the lower sash and the sill.

D represents the casing of a window, such as is constructed in permanent buildings. *a* is the upper, and *b* is the lower, sash of that class in which the sashes are arranged to slide up and down. Directly above the upper sash we construct a box or recess, U, in the casing or wall, into which a screen, A, can slide like a drawer. This screen is provided with a suitable frame on its two ends and upper edge, while its lower edge is attached to the upper rail of the upper sash, so that when the upper sash is lowered the screen will be drawn out of its box or recess, so as to cover the opening between the upper rail of the sash and the top of the window-opening. Below the lower sash we also make a similar box or recess inside of the wall or casing, and in this box or recess we place a screen, B, which is similar to screen A, only it has an independent frame entirely around it. This lower screen B we provide with a metallic strap, E, or other equivalent fastening, by means of which the screen-frame may be attached to the lower rail of the lower sash, so that it can be either attached to or detached from the lower rail of the lower sash at pleasure.

It is often necessary and desirable to raise the lower sash without raising the screen attachment, so that a person can put his head or hand out of the window, and this could not be done if the lower screen were permanently attached to the lower sash; but our arrangement avoids all trouble. It enables the person who raises the lower sash to attach or detach the screen at pleasure.

The upper screen, however, is permanently attached to the upper sash, so that it really forms a continuation of it. This is better, as it is often desirable to leave the upper sash lowered at night, to admit air to the apartment, in which case joints or detachable fastenings are objectionable, on account of the ease with which the parts can be separated by burglars sufficient to allow them to effect an entrance.

The lower screen could be dispensed with, if desired, as the upper screen is a very good protection for the window; but we prefer to employ both screens.

We are aware that a screen has been permanently attached to the lower rail of a single sash, such as is used for car-windows, so that it would slide into a box or recess in the wall or casing; but its object was to exclude cinders and particles of matter. We, therefore, do not claim a screen permanently attached to the lower rail of a window-sash.

In order to keep out the wet, a strip of wood or metal, D, may be attached to the sill of the window, and extended up into a groove in the bottom rail of the lower sash.

A guard or strip of elastic substance, C, is fastened to the meeting-rail of the lower sash, thus preventing any entrance of insects when the window is opened.

Having thus described our invention, what we claim, and desire to secure by Letters Patent, is—

1. The screen B, provided with an independent frame, and arranged to slide in a box or recess below the lower sash of the window, when said screen is provided with a catch, E, for attaching it to the lower rail of the lower sash, or detaching it therefrom at pleasure, substantially as and for the purpose described.

2. The combination, with a double-sash window, of the top screen A, lower screen B, and guard-strip C, constructed and arranged as herein described.

In witness whereof we hereunto set our hands.

GEORGE REED,
*By his Guardian, R. Hochkofler.*
WM. C. HOAGLAND
JOHN J. NEWSOM.

Witnesses:
LOUIS FRANCONI,
H. DURBROOD.